United States Patent [19]

Hayes

[11] 4,342,372
[45] Aug. 3, 1982

[54] TELESCOPIC STRUT SUSPENSION FOR SNOWMOBILE SKIS

[75] Inventor: Stanley G. Hayes, Horicon, Wis.

[73] Assignee: Deere & Company, Moline, Ill.

[21] Appl. No.: 140,730

[22] Filed: Apr. 16, 1980

[51] Int. Cl.³ .............................................. B62B 17/04
[52] U.S. Cl. ....................................... 180/182; 280/25
[58] Field of Search .................... 180/182, 190, 9.2 R, 180/9.24 A; 280/25, 22, 21 R, 16; 267/34, 8, 175, 177

[56] References Cited

U.S. PATENT DOCUMENTS

| | | | |
|---|---|---|---|
| Re. 27,676 | 6/1973 | Erickson | 280/26 |
| 3,425,707 | 2/1969 | Horiuchi et al. | 280/16 |
| 3,603,575 | 9/1971 | Arlasky | 267/34 |
| 3,674,104 | 7/1972 | Gostomski | 180/190 |
| 3,692,130 | 9/1972 | Stacey | 180/184 |
| 3,877,687 | 4/1975 | Sarti | 267/34 |
| 3,931,862 | 1/1976 | Cote | 280/21 R |
| 3,977,485 | 8/1976 | West et al. | 280/21 R |
| 3,984,119 | 10/1976 | Okazima | 267/177 |

*Primary Examiner*—Joseph F. Peters, Jr.
*Assistant Examiner*—Donald W. Underwood

[57] ABSTRACT

A snowmobile ski suspension comprises a telescopic strut formed from a fixed support tube and a guard tube reciprocably and swivelly mounted in the guard tube. The support tube is fixed to one end of a crossbar of the snowmobile frame. Steering of a ski attached to the bottom of the guard tube is accomplished by rotating a bifurcated steering arm, which is journaled on the support tube so as to straddle the crossbar, the steering motion being transferred to the ski by a hinge connected between the steering arm and the ski. A shock absorber and a coil compression spring are mounted in the strut and act to resist collapse of the latter.

6 Claims, 4 Drawing Figures

TELESCOPIC STRUT SUSPENSION FOR SNOWMOBILE SKIS

BACKGROUND OF THE INVENTION

The present invention relates to snowmobile suspensions and more particularly relates to front ski suspensions for snowmobiles.

The most common type of suspension used heretofore for snowmobile skis has included a leaf spring extending lengthwise of and having an end fixed to a ski with the spring additionally being fastened at a location intermediate of its ends to a steering spindle. These suspensions further include a shock absorber having one end secured to the ski at a location adjacent one end of the spring and having its other end secured either to the spindle or to the spring in the vicinity of the spindle whereby the shock absorber operates to damp the action of the spring. This type of suspension has the disadvantage that there is not a one-to-one correspondence between the deflection of the spring and the action of the shock absorber and consequently the skis are not as much under control as is necessary for contributing to a smooth ride.

During the past ten years, various designs of snowmobile ski suspensions have been proposed wherein a shock absorber is mounted in axial alignment with a coil compression spring between the snowmobile frame and the ski so that a one-to-one correspondence between spring and shock absorber action occurs. Such designs are disclosed in U.S. Pat. No. 3,674,104 granted to Gostomiski on July 4, 1972, U.S. Pat. No. 3,692,130 granted to Stacey on Sept. 19, 1972, U.S. Pat. No. 3,931,862 granted to Cote on Jan. 13, 1976 and U.S. Pat. No. 3,977,485 granted to West et al. on Aug. 31, 1976. Each of these patented designs suffers from one or more of the disadvantages due to their suspension struts lacking lengthwise compactness, of having a relatively short travel or of being structured such as to not easily accommodate different sizes of coil compression springs or such that the pre-set compression of their springs cannot be adjusted without at least partial disassembly of the struts.

SUMMARY OF THE INVENTION

According to the present invention, there is provided an improved telescopic suspension for snowmobile skis.

A broad object of the invention is to provide a telescopic suspension which overcomes each of the above-mentioned disadvantages associated with the prior art designs.

A more specific object is to provide a telescopic strut including a coil compression spring surrounding and extending co-extensive with at least one-half the length of the cylinder of a shock absorber located within an inner tubular member reciprocally and swivelly mounted in an outer tubular member fixed to the snowmobile frame.

A further object of the invention is to provide a telescopic strut wherein the spring and shock absorber are located substantially entirely within inner and outer coaxial tubular members, to anchor the rod end of the shock absorber in the top of the outer tubular member and to provide a cam member between the anchor and the upper end of the spring with the cam being adjustable to change the pre-set compression of the spring by inserting a tool through the top of the outer tubular member.

Still another object is to fix the inner tubular members of each telescopic strut to an end of a transverse main frame bar and to provide a steering arm for each strut which includes upper and lower sections located above and below the bar and journalled on the outer tube.

Yet another object of the invention is to provide a telescopic strut wherein a rubber block is mounted between a cap closing the inner tubular member and a ski attached to the strut by a pin passing through the cap.

These and other objects will become apparent from a reading of the following description in conjunction with the appended drawings.

DESCRIPTION OF THE PREFERRED EMBODIMENT

Figure 1:
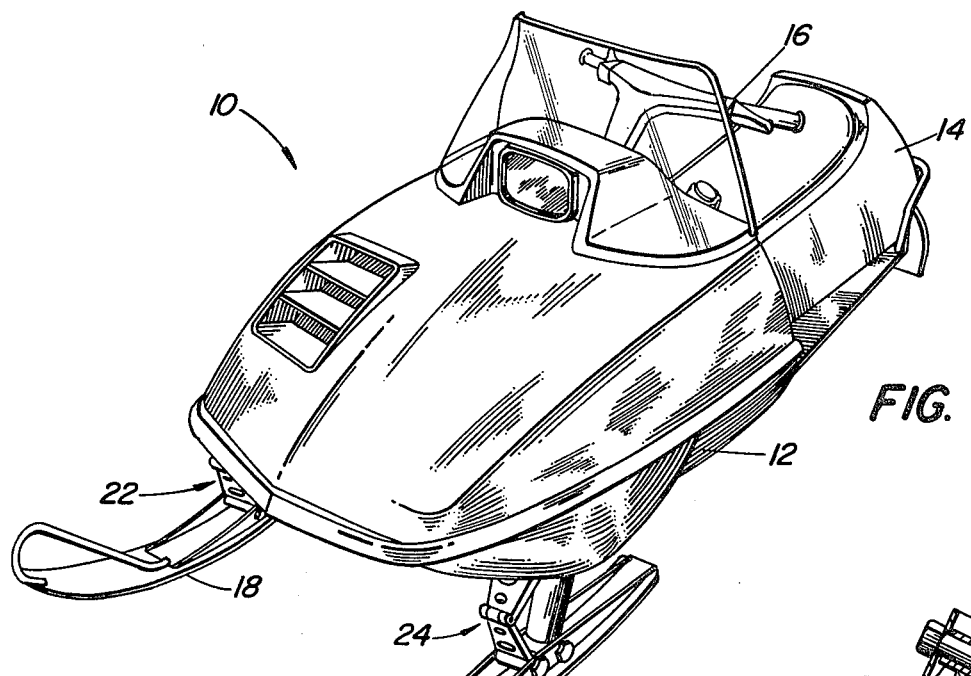
FIG. 1 is a left front perspective view of a snowmobile embodying telescopic suspension struts constructed in accordance with the principles of the present invention.

Referring now to FIG. 1, therein is shown a snowmobile 10 including a chassis 12 supporting an operator's seat 14 rearwardly of a steering mechanism 16 for effecting steering of right and left skis 18 and 20, respectively, suspended from the chassis by identical right and left suspensions 22 and 24, respectively. For the sake of brevity, only the left suspension is illustrated and described in detail, however, such portions of the right suspension as are illustrated are indicated by a primed form of the reference numeral applied to the corresponding portions of the left suspension.

Figure 2:
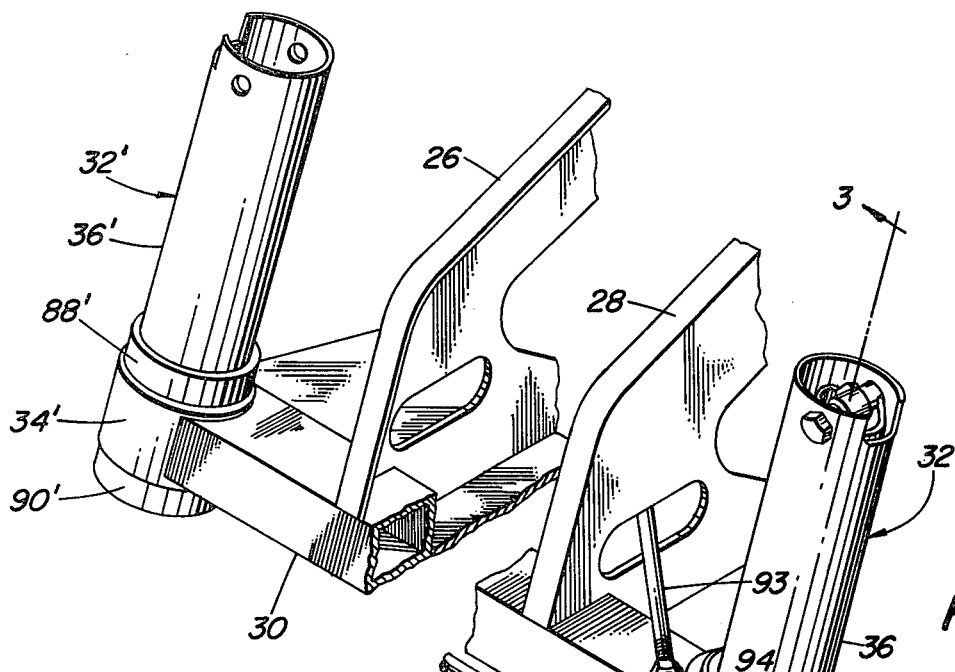
FIG. 2 is a left front perspective view showing mounting of the ski suspension struts to the main frame and with parts of the right strut being removed for clarity.

Referring then to FIG. 2, it can be seen that the chassis 12 includes a framework comprising right and left fore-and-aft extending, transversely spaced, vertical plate members 26 and 28 respectively, having their forward ends joined by a crossbar 30. The suspensions 22 and 24 are secured, as by weldments, to the opposite ends of the crossbar 30. Specifically, the suspension 24 includes an outer cylindrical support tube 32 having a relatively thick-walled bearing section 34 welded to the crossbar 30 and a thin-walled shock absorber mounting section 36 forming an upward extension of the section 34. Similarly, the suspension 22 includes an outer cylindrical tube 32' comprising a relatively thick-walled bearing section 34' welded to the right end of the crossbar 30 and a thin walled shock absorber mounting section 36' forming an upward extension of the section 34'.

Figure 3:
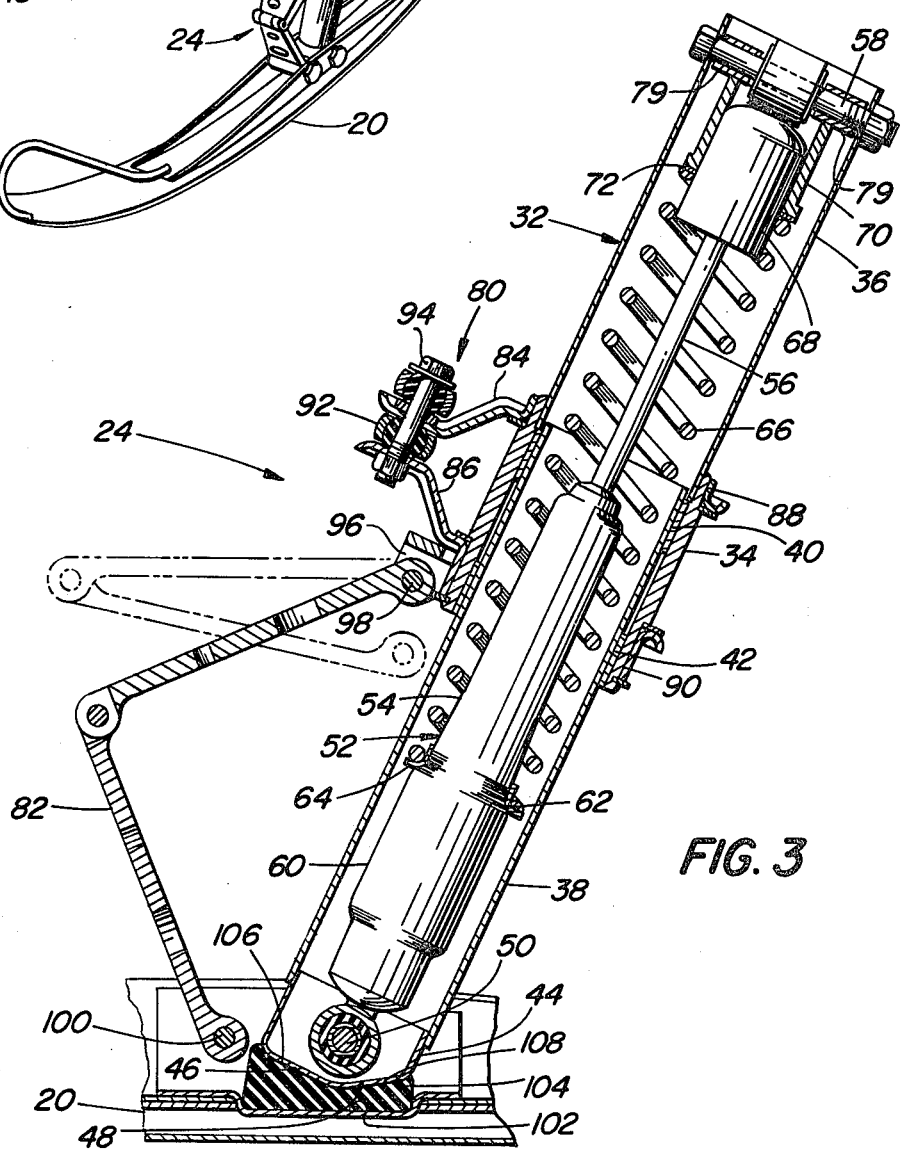
FIG. 3 is a vertical sectional view taken along line 3—3 of FIG. 2.

As can best be seen in FIG. 3, the suspension 24 further includes an inner cylindrical guard tube 38 reciprocably and swivelly mounted in the outer tube 32 to thus form a telescopic strut, it being noted that the inside of the bearing portion 34 of the outer tube is provided with upper and lower annular bushings or bearings 40 and 42, respectively, made from any suitable antifriction material.

Closing the bottom of the inner tube 38 is a cap 44 having a pair of lower surfaces 46 and 48 angled relative to each other such that the bottom of the cap is generally V-shaped in vertical cross-section. The cap 44 is received between laterally spaced flanges at the top of the ski 20 and a bolt 50 is received in aligned bores in the cap and flanges and, thus, serves to secure the inner tube 38 to the ski 20.

Figure 4:
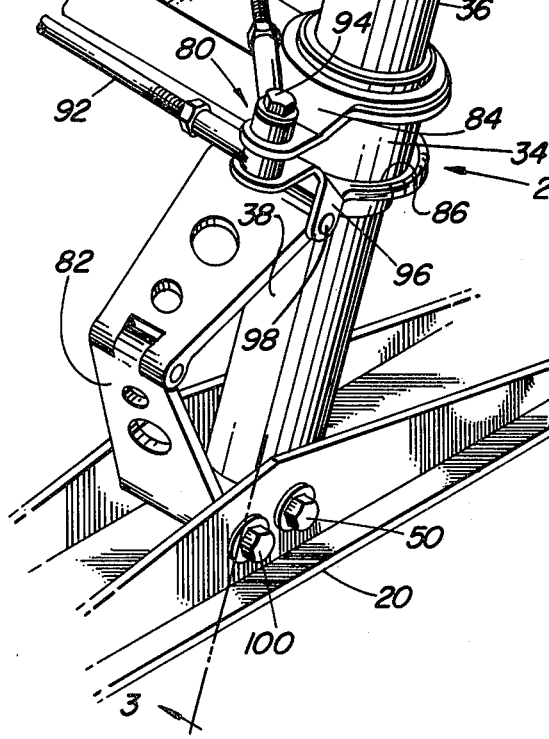
FIG. 4 is a perspective view, with parts shown in phantom for clarity, of the spring compression adjustment cam.
Figure 4:
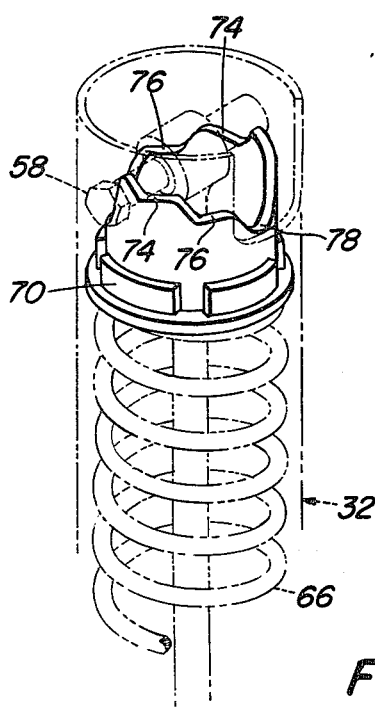

A shock absorber 52 is disposed within the telescopic strut formed by the inner and outer tubes 38 and 32 and includes a cylinder 54 having its lower end anchored by the bolt 50 and a piston rod 56 having its upper end anchored by a bolt 58 received in a crossbore provided in the upper end of the shock absorber mounting section 36 of the inner tube 32. The cylinder 54 has an enlarged lower end portion 60 defining an upwardly facing shoulder 62 located more than halfway from the top to the bottom of the cylinder. A spring retaining washer 64 rests on the shoulder 62 and a coil compression spring 66 is mounted over the shock absorber with its lower end engaging the washer 64. Fixed to the upper end of the rod 56 at a location below the bolt 58 is an inverted cylindrical cup 68 having a cylindrical tubular spring adjustment cam 70 received thereon. The lower end of the cam 70 rests on a washer 72 which in turn rests on the upper end of the spring 66. The upper end of the cam 70 is configured to establish three different plateaus 74, 76 and 78, respectively, (FIG. 4) which may be selectively brought into engagement with spacers 80 carried by the bolt 58 to effect selected pre-compressed states in the spring 66 to maintain the telescopic strut in a normally extended condition. Thus it will be appreciated that the cam 70 is accessible through the open top of the tube 32 and may be adjusted without disassembling any portion of the suspension 24.

From FIG. 3, it can be seen that sufficient clearance exists between the spring 66 and the walls of the telescopic strut that a heavier spring may be substituted if desired.

As can best be seen in FIGS. 2 and 3, steering of the ski 20 is accomplished through means including a steering arm 80 rotatably mounted on the tube section 34 and linked to the ski 20 by a hinge 82. Specifically, the steering arm 80 comprises upper and lower sections 84 and 86, respectively, spaced above and below the level of the crossbar 30. The upper and lower steering arm sections 84 and 86 are respectively rotatably received on annular bearing surfaces 88 and 90 located on the exterior of the tube section 34 at its upper and lower ends, which results in the steering forces being less concentrated than would be the case if the steering arms were designed to operate entirely above or below the crossbar 30. Similar bearing surfaces 88' and 90' are shown in FIG. 2 on the right support tube section 34'. The steering arm sections 84 and 86 are releasably joined to each other and to an end of a steering transfer rod 92 and to a steering input rod 93, as by a bolt 94, the rod 92 having its other end connected in a similar fashion to a steering arm associated with the suspension 22 and the other end of the rod 93 being connected to the steering mechanism 16. The lower steering arm section 86 includes a pair of forwardly extending lugs 96 having aligned holes therein which receive a pin 98 that connects the upper end of the hinge 82 to the steering arm. A pin 100 serves to connect the lower end of the hinge to the ski 20. Thus, steering motion is transferred to the ski 20 in much the same way that steering motion is transferred to the nose wheel of some aircraft.

The upper surface of the ski 20 is provided with a recess 102 located below the cap 44 at the lower end of the tube 38. Located within the recess 102 is a rubber block 104 having a pair of upper surfaces 106 and 108 which are complimentary to and in engagement with the cap surfaces 46 and 48. The block 104 is thus positioned to interact with the cap 44 for preventing excessive ski flop.

The operation of the suspensions 22 and 24 is thought to be clear from the foregoing description and for the sake of brevity is not reiterated here. Suffice it to say that the arrangement of the springs and shock-absorbers within the struts of the suspensions makes possible struts which are relatively lengthwise compact without sacrificing suspension travel.

I claim:

1. In a snowmobile having a pair of steerable skis respectively connected in supporting relationship to a forward portion of a frame by a pair of suspensions, the improvement wherein each suspension, comprises: a support tube forming a forward portion of the frame; a guard tube reciprocably and rotatably mounted in the support tube and having a lower end connected to one of the pair of skis; steering means operatively connected to the guard tube for selectively turning the latter within the support tube to effect steering of the snowmobile; an extensible and retractable shock absorber exclusive of the guard tube and including a cylinder located entirely within and completely spaced from the guard tube whereby the guard tube may become dented without affecting the operation of the shock absorber; said cylinder having an end connected to the one of the pair of skis; said shock absorber further including a piston rod having an end fixed directly to the frame; a coil compression spring received over the shock absorber and mounted to yieldably resist retraction of the shock absorber; said spring being located to extend coextensively with at least one-half of the length of the cylinder.

2. The snowmobile defined in claim 1 wherein said steering means includes a steering arm rotatably mounted on the support tube; and a hinge linking the arm to the one of the pair of skis for establishing a steering connection with the guard tube while at the same time permitting the latter to reciprocate within the support tube.

3. The snowmobile defined in claim 2 wherein the frame includes a transverse crossbar having said support tube joined to one end thereof; and said steering arm including upper and lower releasably interconnected sections respectively rotatably mounted on the support tube at locations above and below the crossbar.

4. The snowmobile defined in claim 1 wherein the guard tube has its lower end closed by a cap; said guard tube being connected to the one of the pair of skis by a bolt extending through the cap and defining a horizontal pivot axis for the ski; said cap having a downwardly facing surface being generally V-shaped in vertical cross-section and having a central lowermost portion; a resilient block mounted between the ski and the cap and having an upper surface shaped complimentary to and engaged with the bottom surface of the cap, whereby horizontal pivoting of the ski about said axis is controlled by the resilient block.

5. The snowmobile defined in claim 1 wherein the shock-absorber cylinder includes an enlarged bottom portion defining and upwardly facing annular shoulder; a spring retainer received on the shock absorber and engaging the shoulder; and the spring having a lower end engaging the spring retainer.

6. The snowmobile defined in claim 1 wherein the support tube cooperates with the guard tube to form a telescopic strut which extends the full length of the shock absorber; a second bolt extending crosswise through an upper end portion of the support tube and serving to anchor the one end of the shock absorber piston rod; a tubular spring adjustment cam rotatably and axially shiftably mounted on the rod below the second bolt and including a cam surface defining a plurality of axially spaced plateaus which may selectively be brought into engagement with the second bolt by rotating the cam about the rod for the purpose of effecting different pre-compressed states in the spring; and said frame tube having an open top making the cam accessible for adjustment without requiring any disassembly of the suspension.

* * * * *